United States Patent [19]

Nakatani et al.

[11] Patent Number: 5,187,708
[45] Date of Patent: Feb. 16, 1993

[54] COMMUNICATION DEVICE FOR LAYERED PROTOCOLS

[75] Inventors: Naofumi Nakatani, Takatsuki; Reiko Ueno, Neyagawa; Hiromasa Nakatsu, Osaka, all of Japan

[73] Assignee: Matsushita Electric Industrial Co., Ltd., Osaka, Japan

[21] Appl. No.: 592,531

[22] Filed: Oct. 3, 1990

[30] Foreign Application Priority Data

Oct. 6, 1989 [JP] Japan ................... 1-262426

[51] Int. Cl.⁵ .......................... H04J 3/02; H04J 3/24
[52] U.S. Cl. ................................. 370/85.1; 370/94.1
[58] Field of Search ............ 370/54, 58.1, 58.2, 370/58.3, 60, 60.1, 85.1, 85.2, 85.6, 85.13, 85.14, 94.1, 110.1; 340/825.5, 825.51, 825.52; 358/85; 364/200 MS File, 900 MS File

[56] References Cited

U.S. PATENT DOCUMENTS

| | | | |
|---|---|---|---|
| 4,893,307 | 1/1990 | McKay et al. | 370/94.1 |
| 4,922,484 | 5/1990 | Yoshida et al. | 370/110.1 |
| 4,941,089 | 7/1990 | Fischer | 370/94.1 |
| 4,991,133 | 2/1991 | Davis et al. | 370/94.1 |

Primary Examiner—Douglas W. Olms
Assistant Examiner—Alpus H. Hsu
Attorney, Agent, or Firm—Stevens, Davis, Miller & Mosher

[57] ABSTRACT

A communication device comprising an upper layer communication control unit having a plurality of upper layer communication protocols; a lower layer communication control unit, subordinated to the upper layer communication control unit, having a function to forming an inter-upper-layer communication by transmitting the data sent from the upper layer communication control unit to a communication transmission path or sending the data received from the communication path to the upper layer communication control unit; and a communication path register memory for storing a set of the address of a communication partner device, the discriminator of the upper layer communication protocol being used and the name of a communication path. In the above communication device, a request of setting/cancelling of the communication path, or a transmission request as well as designation of the communication path to be used is performed from the upper layer communication control unit to the lower layer communication control unit, and indication of setting/cancelling of the communication path, or indication of the communication path used as well as reception indication is performed from the lower layer communication control unit to the upper layer communication control unit.

5 Claims, 11 Drawing Sheets

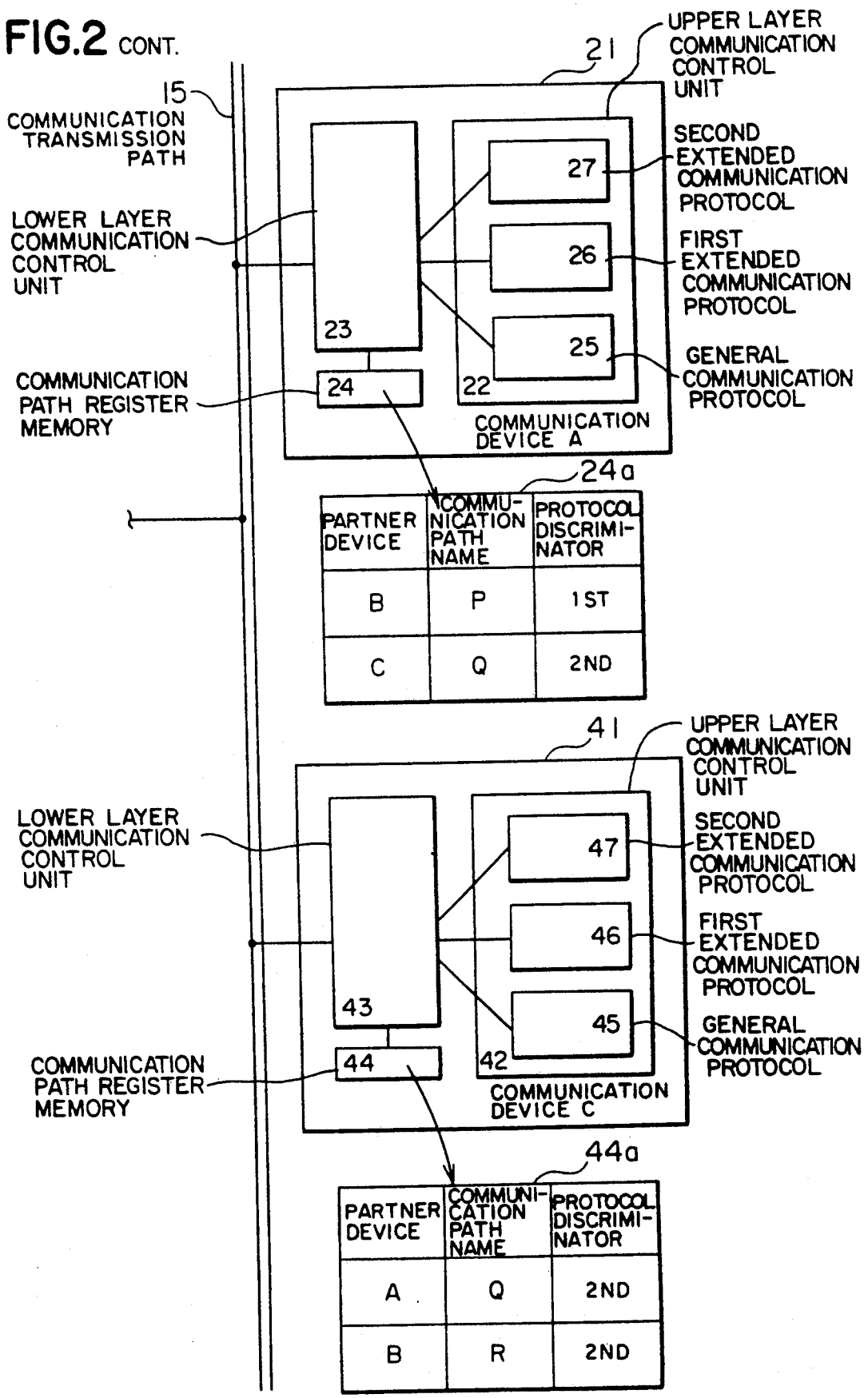

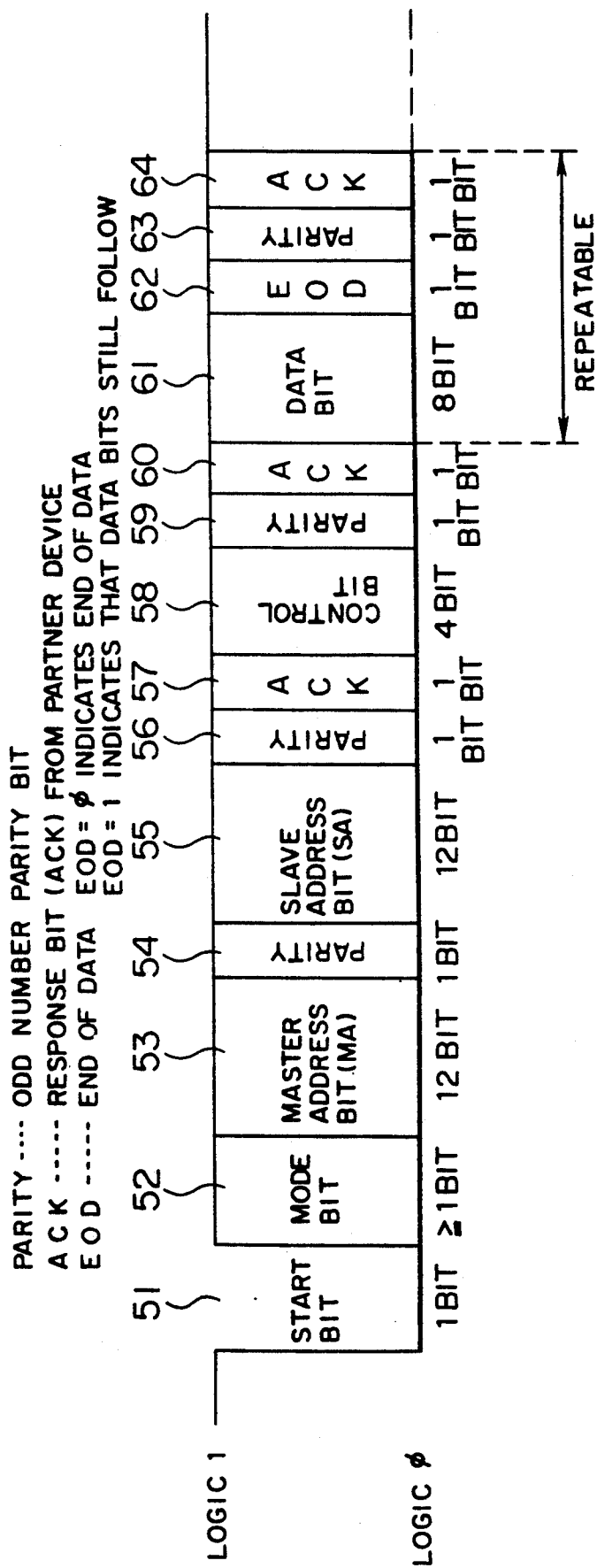

COMMUNICATION DEVICE FOR LAYERED PROTOCOLS

BACKGROUND OF THE INVENTION

The present invention relates to a communication device for an audio-video-communication (AVC) system (hereinafter referred to as an AVC communication device), and more particularly to an AVC communication device to be connected with each of individual AVC devices constituting an AVC communication system. The AVC communication system is composed of a plurality of AVC devices, e.g. an audio amplifier, television tuner, a video deck (VTR), a television monitor, a video disk player (VD), a compact disk player (CD), and a personal computer communication terminal (PC).

In a conventional AVC system, an AVC communication device, which serves to control the corresponding AVC device in accordance with a command in the communication telegram received from a communication medium, and inform the other AVC device of the communication telegram indicative of the operation status thereof, is required to recognize the communication telegram from each other and so to follow a common command code and control sequence (the protocol in an application layer); thus, in view of future extension, a command extension code is defined at a portion of a command table as shown in FIG. 9. Although such a measure in the conventional AVC system for the future extension has a possibility of adding a new control command, it in conveniently fixes the control sequence i.e. the protocol in an application layer. Further, if an AVC device which cannot sufficiently show its function in a predetermined command format appears, it is required to make a new command format. The prior art technique to solve such a problem is to define an extension command of shifting the application protocol to a new one using the extension code in the predetermined command format and, after executing this extension command, to follow the new application protocol having an entirely new command format. This prior art will be explained in detail with reference to FIG. 10.

FIG. 10 shows an AVC system comprising the conventional AVC communication devices. In FIG. 10, 111 is a VTR, 112 is a television tuner and 113 is a television monitor. These AVC devices, which are connected with the corresponding communication devices 114, 115 and 116, respectively, can send a control command and a status signal from each other through a communication transmission path 126. Communication device 114 is composed of a communication unit 117, a receiver 120 and a driver 121. Communication device 115 (or 116) is also composed of a communication control unit 118 (or 119), a receiver 122 (or 124) and a driver 123 (or 125).

FIG. 9 shows the command format to be executed by the communication control unit in the conventional AVC communication device. Each of the codes constituting a command is composed of one-byte operation code (OPC) and a plural-byte operand (OPR) qualifying OPC (as the case may be, OPC is not qualified by OPR). In FIG. 9, 101 is an area where the high order four bits are 8 to F (HEX notation) and several kinds of OPC's are defined. 102 is an area where the high order four bits are 0 to 7 and several kinds of OPR's are defined. 103 is a region which is not still defined in the OPC area, i.e. a preliminary region. 104 is a region where OPC for a general command is defined. 105 is a region where OPC for a function group command is defined. 106 is a region where OPC for a function specific command is defined. 107 is a region which is not still defined in the OPR area, i.e. a preliminary region. 108 is a region where the ASCII code is defined, or the control value for indicating or controlling increase/decrease and size are defined. 109 is a region where the standard operand indicative of 'ON' and 'OFF' of power supply control. 110 is a region where the code indicative of command extension at 'BF' (HEX notation) in the general command is defined. The rule therefor is to add a new command code after 'BF' if the command which is not still defined is required. The necessity of command extension can be given in accordance with a manufacturer's individual thought. In this case, 'BF' may be succeeded by a manufacturer's code after which a new command code is added. Further, if a new AVC device cannot sufficiently show its function in the command format as shown in FIG. 9 even if the extension command ('BF') is used, it is necessary to use another command format and application protocol. To this end, it is possible to define, in the command format of FIG. 9, a command (hereinafter referred to protocol switching command) requiring the application protocol hitherto used into a new application protocol.

Now it is assumed that in FIG. 10, service from VTR 111 to television tuner 112 is started in accordance with a new application protocol. First, communication device 114 associated with VTR 111 must require to communication device 115 associated with television tuner 112 to enter the communication mode according to a new application protocol by sending a protocol switching command to communication device 115 in accordance with the application protocol hitherto used. Until this procedure has been completed, it is not possible to execute the communication between VTR 111 and television tuner 112 in accordance with the new application protocol. However, now if television monitor 113 requires service of television tuner 112 using the command hitherto used, communication control unit 118 of communication device 115 associated with television tuner 112 cannot decode the data sent. In order to avoid this difficulty, the portion of processing an application protocol in each of the communication units must search a communication partner to ascertain which application protocol the partner uses and thereafter decode the command and data. However, the portion of processing an application protocol should essentially be dedicated to processing the application protocol but not be used for the confirmation of the kind of the application protocol. If this rule is not observed, function sharing in processings within the communication control unit cannot be clarified; thus, when a difficulty occurs, it is difficult to decide the corresponding portion.

Further, the communication frame flowing through a communication transmission path cannot usually carry a limited number of data at a time. The home bus system, which is defined in *Standards of Electronic Industries Association of Japan* as a system using coaxial cable and a twisted-pair cable installed with a home, actually used at present carry up to 256 bytes in one frame, and the D2B system, which is defined in *International Standard* as audio, video and audio-visual systems using Domestic Digital Bus (D2B) for interconnecting devices and exchanging messages needed in the audio-video cluster (TV set, VCR, etc.), can carry up to 2

(two) bytes in mode 0, up to 32 bytes in mode 1 and up to 128 bytes in mode 2. Therefore, an improved protocol to be developed in the new application protocol is always limited by the number of data which can be transmitted at a time. Namely, the application protocol cannot be taken independently of the communication system of a communication frame actually flowing through the communication transmission path.

As described above, the conventional AVC communication device has an extension command permitting command extension but it cannot take the procedure of transmitting/receiving a command, i.e. application protocol. Therefore, in the case where a new application using a new AVC device with development of technology is to be taken, it is possible to improve the function of a AVC communication system only within the range of the predetermined application protocol. Further, even if shift to the new application can be made by defining in the extension command a command which serves as a switch of switching the application protocol hitherto used into a new application protocol, software or hardware of processing the application protocols must decide which application protocol each of communication parties is to use or is using. Thus, function sharing in each software or hardware cannot be clarified so that it is difficult to decide where malfunction has occurred. Further, the home bus system or the D2B system can carry, in one communication frame flowing on the communication transmission path, only a limited number of data up to 256 bytes, 2 bytes or 32 bytes. Thus, one message cannot develop such an application protocol as does not exceed a transmittable frame length and also must consider the rule on a communication transmission path in an application.

SUMMARY OF THE INVENTION

In view of the above problems, an object of the present invention is to provide a communication device which can improve the function of application protocols as thoroughly as possible with technology development, is not required to manage the using status of a communication party for each application protocol by itself, and can realize an application protocol which is not limited by the number of data transmittable bytes in a frame which is a rule on a communication medium.

A communication device according to the present invention is divided into an upper layer communication control unit and a lower layer communication control unit which serve to execute an application protocol, and comprises a communication path register memory for storing a discriminator of the communication path used for each of communication parties and/or a discriminator of an upper layer communication protocol. The upper layer communication unit has a plurality of upper layer communication protocols. The lower layer communication control unit at the lower rank of the upper layer communication control unit performs the processings of transmitting the data sent from the upper layer communication unit to a communication medium and sending the data received from the communication medium to the upper layer communication control unit; of sending, if a communication setting request for communication in accordance with the upper layer communication protocol is received from the upper layer communication control unit, to a communication party device a preamble code indicative of start of the communication in accordance with the upper layer communication protocol, a communication path discriminator and/or a code indicative of the name of the upper communication protocol, and registering, if they are received, a discriminator for a communication party device, a communication path discriminator and a discriminator of the upper layer communication protocol in the communication path register memory; transmitting, if the length of data according to the upper layer communication protocol exceeds the data length permitted in one frame on the communication medium, dividing the data into for each permitted length to transmit the divided data for each frame, and sending, if the frame including the divided data according to the upper layer communication protocol is received from the communication medium, to the upper layer communication control unit the data composed by plural frames after the reception until they are composed into the data according to the upper layer communication protocol. The communication device further comprises means for, from the upper layer communication control unit to the lower layer communication control unit, requesting setting/cancelling of a communication path, or designating the communication path to be used and also requesting the transmission, and from the lower layer communication control unit to the upper layer communication control unit, displaying setting/cancelling of a communication path, or displaying the reception and also the communication path used.

In the case where an AVC communication device is short of an application protocol and a command format, the above arrangement according to the present invention can easily establish an application protocol and a command which are suitable to a new AVC system. Further, one AVC communication device can include a plurality of application protocols, and the lower layer communication control unit undertake management on a communication path, i.e. searching the protocol which is being used by each of communication parties. Thus, the upper layer communication control unit has only to execute a clearly defined function and also each of the application protocols permits an application message to be transmitted/received without considering the maximum number of data bytes which can be transmitted at one time on the communication path.

BRIEF DESCRIPTION OF THE DRAWINGS

FIG. 3 is a telegram format handled transmission/reception by the communication device of FIG. 1;

DESCRIPTION OF THE PREFERRED EMBODIMENT

Figure 1:
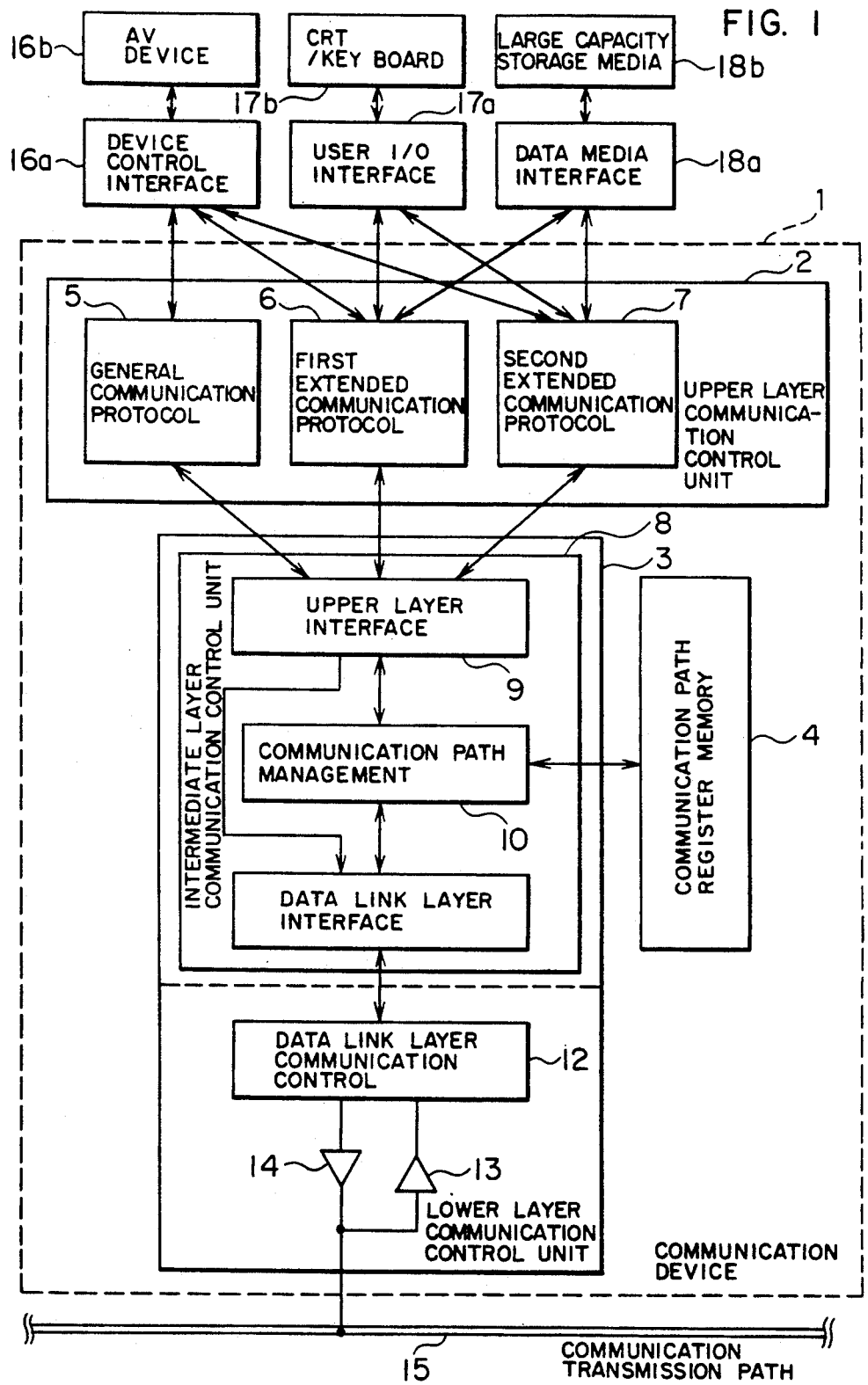
FIG. 1 is a block diagram of the communication device according to one embodiment of the present invention.

FIG. 1 shows the communication terminal of the AVC communication device according to one embodiment of the present invention. In FIG. 1, 1 denotes a communication device; 2 denotes an upper layer communication control unit (ULCCU) handling several application protocols; 3 denotes a lower layer communication control unit (LLCCU) subordinate to ULCCU 1; and 4 denotes a communication path for storing a communication partner and a discriminator for the application protocol used. ULCCU 1 is composed of a general communication protocol unit 6, a first extended communication protocol unit 7 and a second extended communication protocol unit 8. LLCCU 3 is composed of an intermediate communication control unit 8, data link layer communication control unit 12, and a receiver 13 and driver 14 which serve to convert a logic signal into an electric physical signal, and vice versa. 15 denotes a communication transmission path connected with receiver 13 and driver 14, through which communication is executed among communication devices. 16a denotes a device control interface unit which can be controlled by general communication protocol unit 5, first extended communication control unit 6 second extended communication control unit 7. 16b denotes an AVC device which is connected with communication device 1 through device control interface unit. 17a denotes a user I/0 interface unit, and 17b denotes a CRT/key board which is connected with communication device 1 through user I/0 interface unit 17a. 18a denotes a data medium interface unit, and 18b is a large scale storage medium which is connected with communication device 1 through data medium interface unit 18a. Both 17a and 18a can make data transfer for first and second extended communication protocol units 6 and 7.

Figure 2:
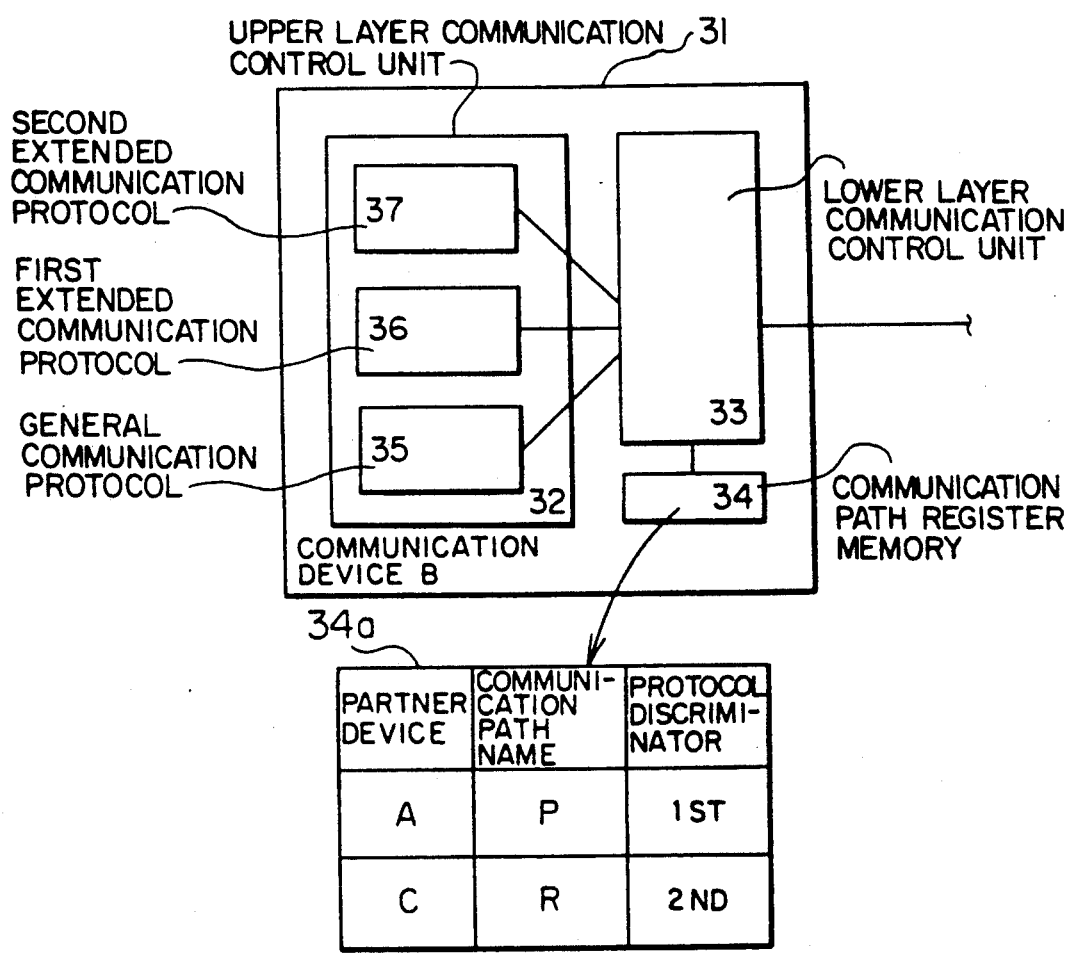
FIG. 2 is a view for explaining the network using the communication devices of FIG. 1 and the communication path register memory included in each of the communication devices of FIG. 1.

FIG. 2 shows the arrangement of each of communication path register memories in a network composed of the communication devices according to one embodiment of the present invention. In FIGS. 2, 21, 31 and 41 denote communication devices A, B and C according to the embodiment of the present invention, respectively. Not shown are AVC device 16b, CRT/key board 17b, and large scale storage medium 18b and the corresponding interface units 16a, 17a and 18a as shown in FIG. 1 which are externally connected with each of communication devices 21, 31 and 41. Communication devices A21, B31 and C41, like the communication device 1 as shown in FIG. 1, are composed of upper layer communication control units (ULCCU) 22, 32, 42, lower layer communication control units (LLCCU) 23, 33, 43 and communication path register memories 24, 34, 44, respectively. Upper layer communication control units 22, 32 and 42 include general communication protocol units 25, 35, 45, first extended communication protocols 26, 36, 46, and second extended communication protocols 27, 37, 47, respectively. 24a, 34a and 44a are communication path register memories extracted for showing the contents of communication path register memories 24, 34 and 44, respectively.

The operation of the AVC communication device according to this embodiment will be explained below. Now it is assumed that a user manipulates CRT/key board 17b in FIG. 1 to request service of data transfer. If this request is concretely a service of data transfer from communication device A21 to communication device B31 in FIG. 2, a primitive of requesting setting of a communication path is issued from first extended communication protocol unit 26 of communication device A21 to LLCCU 23 thereof. LLCCU 23 sends to communication device 31 a telegram on which carried are a preamble code for requesting communication path setting, a discriminator of the first extended communication protocol to be used, a code of requesting communication path setting and a name (now "P" is assumed) of the communication path to be used. When LLCCU 33 of communication device B31 receives this telegram, it recognizes that the extended communication protocol to be used is the first extended communication protocol on the basis of the preamble code and the discriminator of the extended communication protocol included in the telegram, and decodes the code of requesting communication path setting in the telegram to inform first extended communication protocol 36 of having received the request of communication path setting. First extended communication protocol 36 receives this request, it sends to LLCCU 33 a primitive of requesting transmission for a telegram indicative of agreement (response primitive for the communication path setting). When LLCCU 36 receives this response primitive, it registers in communication path register memory 34 the communication path name 'P', the address of the communication device A21 which is a communication partner, the discriminator of the first extended communication protocol to be used, and sends a response telegram for the communication path setting request to communication device A21. LLCCU 23 of communication device A21 receives the response telegram from communication device B31, it sends to first extended communication protocol unit 36 a primitive indicating that a communication path has been established (primitive of confirming communication path setting), and registers in communication path register memory 24 the communication path name 'P', the address of communication device which is a communication partner, and the discriminator of the first extended communication protocol to be used. The sequence hitherto explained establishes a communication path between first extended communication protocol units 26 and 36 of communication devices A21 and B31.

Next, first extended communication protocol unit 26 of communication device A21 sends to LLCCU 23 a first extended communication data unit (data from an external device (e.g. key board) plus first extended communication control information comprising a header code indicative of the kind of data and a frame check code for checking a transmission error) and a transmission requesting primitive. LLCCU 23 adds lower layer communication protocol control information to the first extended communication protocol data unit received, and sends the information thus formed to communication device B31. Then, if the information cannot be held within the data length permitted in the transmission at a time on communication transmission path 15, LLCCU 23 divides the first communication protocol data unit at intervals of the data length permitted in the transmission at a time to send a plurality of telegrams thus formed to communication device B31. LLCCU 33 of communication device B31 searches memory 34 on the basis of the communication path name included in the telegram received and the code indicative of the transmission source of the telegram to recognize the extended communication protocol used. Also LLCCU 33 decides whether or not the telegram(s) received is continuous on the basis of lower layer communication protocol control information; if it is continuous, LLCCU 33 constructs the telegram received so that it is continuous as a complete extended communication protocol data unit. If the complete extended communication protocol data unit has been established, LLCCU 33 sends it together with a reception indication primitive to first extended communication protocol unit 36. First extended communication protocol unit 36 decodes the primitive from LLCCU 33 to recognize that it is reception indication. Thereafter, LLCCU 33 analyzes the first extended communication protocol control information from the first extended communication protocol data unit to examine what kind of data the data received are or if or not there is any error in the data on the basis of the header code and the frame check code, and sends the data to an external device (e.g. CRT).

When the data transfer from communication device A21 to communication device B31 has been completed, in order to cancel the communication path, first extended communication 26 of communication device A21 sends a primitive of requesting cancelling of the communication path and the communication path name to LLCCU 23. LLCCU 23 sends to communication device B31 a telegram on which carried are the code of requesting the communication path cancelling, the communication path name 'P' and a discriminator for the extended communication protocol. When LLCCU 33 of communication device B31 receives this telegram, it shows to first extended communication protocol unit 36 that the request of cancelling the communication path has come. First extended communication protocol unit 36, when recognizing this request, sends to LLCCU 33 a primitive of requesting the transmission of a telegram indicative of the response for the request of cancelling the communication path (primitive of response to the communication path cancelling). LLCCU 33, when receiving this response primitive, sends to communication device A21 a telegram on which carried are the response code to the request of cancelling the communication path, the communication path name 'P' and the discriminator for the extended communication protocol. It also deletes from memory 34 a series of items of information including the communication path name 'P', the address of communication device A21 and the discriminator for the first extended communication protocol used. LLCCU 23 of communication device A21, when receiving the telegram including the response to the request of cancelling the communication path, sends to first extended communication protocol unit 26 a primitive of confirming cancelling of the communication, and also deletes from memory 24 a series of items of information including the communication path name 'P', the address of communication device A21 and the discriminator for the first extended communication protocol.

In this way, a sequence consisting of setting a communication path, data transfer and cancelling the communication path.

In accordance with this embodiment, as shown in FIG. 1, LLCCU 3 is mainly composed of intermediate layer communication control unit (ILCCU) 8 and data link layer communication control unit 12; ICLLU is composed of upper layer interface control unit 9, communication management unit 10 and data link layer interface unit 11. The operation of these units will be explained below.

If there is a necessity that general communication protocol unit 5 of ULCCU 2 should transmit a control data in FIG. 1, communication protocol unit 5 sends to upper layer interface unit 9 a transmission request primitive added to the head of the control data. Upper layer interface unit 9, when receiving the transmission request primitive from general communication protocol 5, sends the control data to data link layer interface unit 11. Data link layer communication control layer 12 serves to manipulate the logic data of a communication telegram flowing through communication path 15 before its conversion into an electrical signal to transmit the telegram to a designated communication device, or if the telegram for itself is received, it serves to respond to a communication partner and also serves as the lowest logic layer of showing reception for data link layer interface unit 11. An usual LSI for communication comprises this control unit 12.

FIG. 3 shows the structure of the communication telegram handled by data link layer communication control unit 12 in this embodiment. The communication telegram shown in FIG. 3 is converted into an electrical signal by a driver which is transmitted onto communication, and converted into a 0.1 signal again. In FIG. 3, 51 denotes a start bit $\phi$ indicative of the start of the telegram. 52 denotes a mode bit indicative of the transmission speed of the communication telegram; this bit is composed of one bit or more. The lowest transmission speed is referred to as a mode $\phi$ which is represented by one bit of $\phi$; a higher mode referred to as mode 1 is represented by '1 $\phi$'; and a further higher mode referred to as mode 2 is represented by '11 $\phi$'. 53 denotes a master address indicative of a transmission source of the communication telegram which is constructed of 12 bits. 54 denotes an odd number parity added to master address 53. 55 denotes a slave address indicative of a reception destination which is constructed of 12 bits. 56 denotes an odd number parity added to slave address 55. 57 denotes a respose ACK bit returned by the reception destination of the communication telegram designated by slave address 54 toward the transmission source (in the response, '$\phi$' is returned). The transmission source continue to transmit the communication telegram recognizing if the ACK bit 57 is returned or not. 58 denotes a control code bit indicative of what property (command, request, or data) the communication telegram has; this control code bit is constructed of 4 bits. 59 denotes a parity bit added to control bit 58. 60, like ACK 57, denotes a response bit returned by the reception destination toward the transmission source. 61 denotes a data bit which is constructed of 8 bits. 62 denotes an EOD (end of data) bit indicative of if the data still continue. If EOD 62 is "$\phi$", the data does not further continue, whereas if EOD 62 "$\phi$", the data still continue. 63 denotes an odd number parity bit added to union of data bit 61 and EOD 62. 64, like ACK's 57 and 60, denotes a response bit returned by the reception destination toward the transmission source. While EOD 62 is "1", data bit 61, EOD 62 (=1), parity 63 and ACK 64 are successively transmitted. However, since the maximum number of data which can be transmitted at a time is predetermined in accordance with the kind of mode, if the data to be transmitted exceeds this limit, the data are divided into a plurality of telegrams to be transmitted. Communication path management unit 10, when receiving the reception indication from data link layer communication control unit 12, examines if the master address indicative of the transmission source of the received telegram has been registered in communication path register memory 4. Now if it has not been registered, communication path management unit 10 examines if the data part of the received telegram contains the preamble code. If the preamble code is not contained, it is decided that the telegram received has been transmitted in accordance with the general communication protocol. Thus, the telegram received is sent to general communication protocol unit 5 through upper layer interface unit 9.

Figure 4:
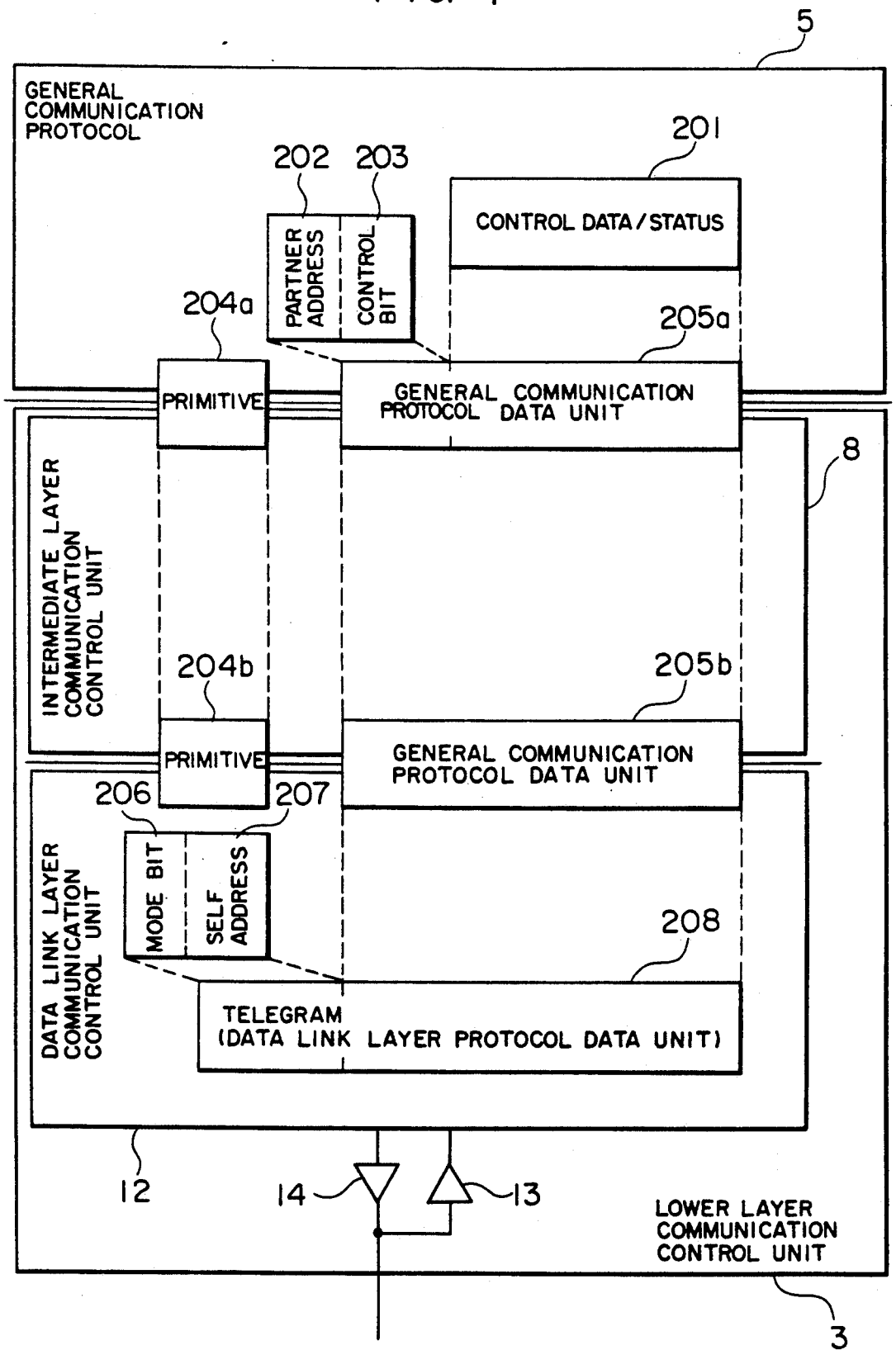
FIGS. 4 to 8 are views for explaining the respective layers of the communication device of FIG. 1 and communication processings therebetween.

FIG. 4 shows the processings in the communication device regarding the above general communication protocol. Now it is assumed that a control data/status 201 has occurred in general communication protocol unit 5. Then, general communication protocol unit 5 adds a communication party address (slave address) and a control bit 203 to the control data/status 201 to provide a general communication protocol data unit 205a, and sends the data unit 205a to intermediate layer communication control unit (ILCCU) 8 together with a primitive indicative of a transmission request. In the case of the communication according to the general communication protocol, ILCCU 8, without performing an internal processing, immediately sends a primitive 204b (equivalent to 204a) indicative of the transmission request and a general communication protocol data unit 205b (equivalent to 205a) to data link layer communication communication control unit 12. Control unit 12 analyzes the received primitive to add a mode bit 206 and a self-address (master address) 207 to the general communication protocol data unit 205b received to provide a telegram (data link layer protocol data unit) 208 to be actually transmitted.

Likewise with reference to FIG. 4, explanation will be explained on the case where the telegram according to the general communication protocol has been received. Data link layer communication control unit 12, when receiving the telegram 208, removes the mode bit 206 and the self-address (slave address) 207 and send to ILCCU 8 the remaining general communication protocol data unit 205b and the primitive 204b indicative of reception indication. ILCCU 8 examines if the communication partner (master address) has been registered in memory 4. If it has not been registered, ILCCU 8 examines if the data part of the received telegram contains the preamble code. When the preamble code is not contained, it is decided that the telegram has been received in accordance with the general communication protocol. Thus, the primitive 204a indicative of the reception indication and the general communication protocol data unit 205a are sent to general communication protocol unit 5. General communication protocol unit 5 analyzes primitive 204a to extract control data/status 201 from general communication protocol data unit 205a for its processing.

Figure 5:
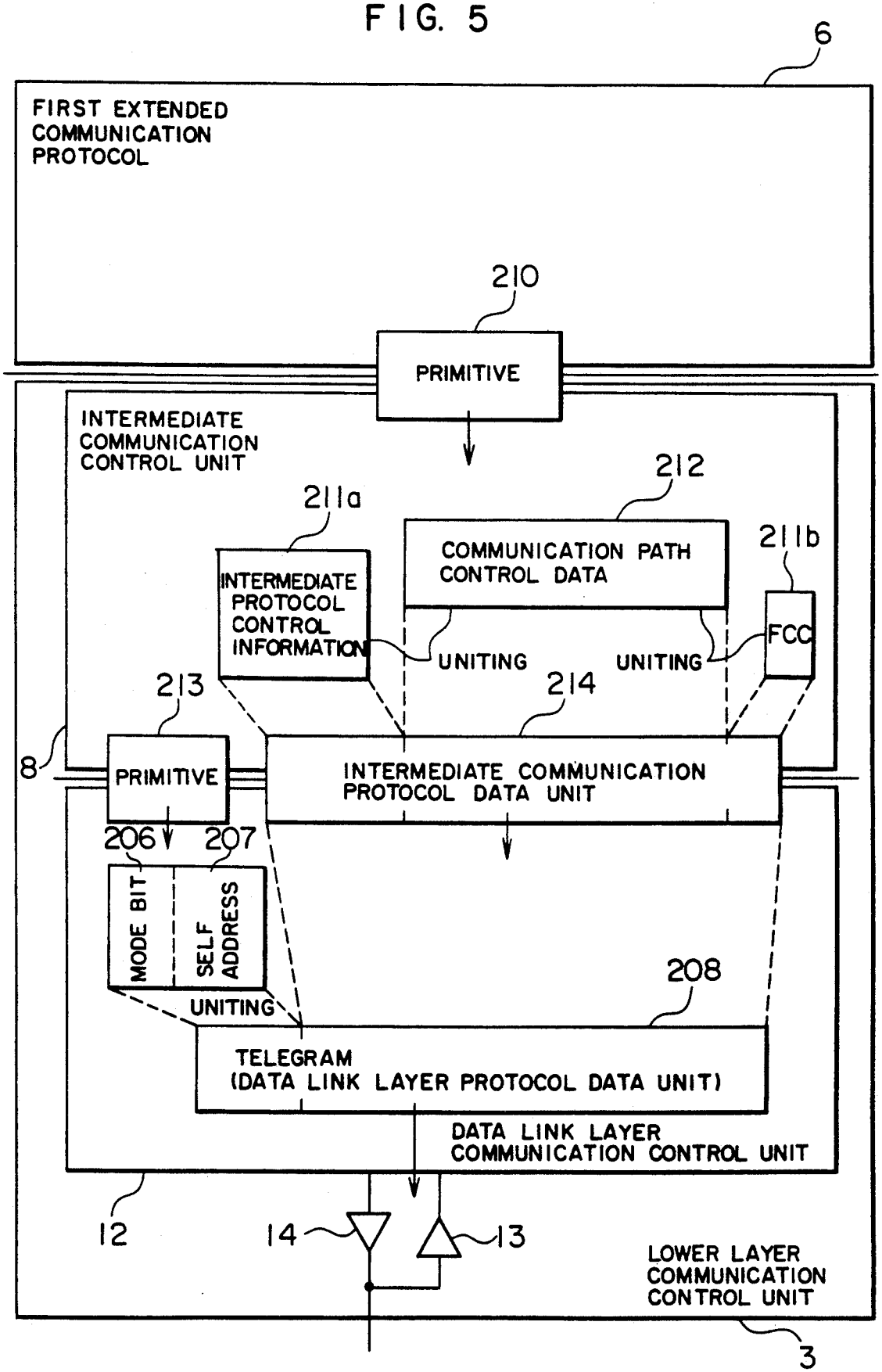

Explanation will given for the processing in LLCCU 3 in the case of the communication of the extended communication protocol. FIG. 5 is a view for explaining setting/cancelling a communication path and response to the notice of setting/cancelling from a communication partner: ILCCU 8, when receiving a primitive 210 of a setting/cancelling request or a setting/cancelling response, unites intermediate layer communication protocol control information 211 including the information for the above request or response, communication path control data 212 including a communication path name, the discriminator of an extended communication protocol used or to be used and a preamble code and a frame check code 211b (FCC) for checking a data error thereby to provide an intermediate communication protocol data unit 214, and send the data unit 214 to data link layer communication control unit 12 together with a primitive of transmission request. The transmission processing in data link layer communication control unit 12 will not be explained here since it is the same as in the case of the communication according to the general communication protocol.

Figure 6:
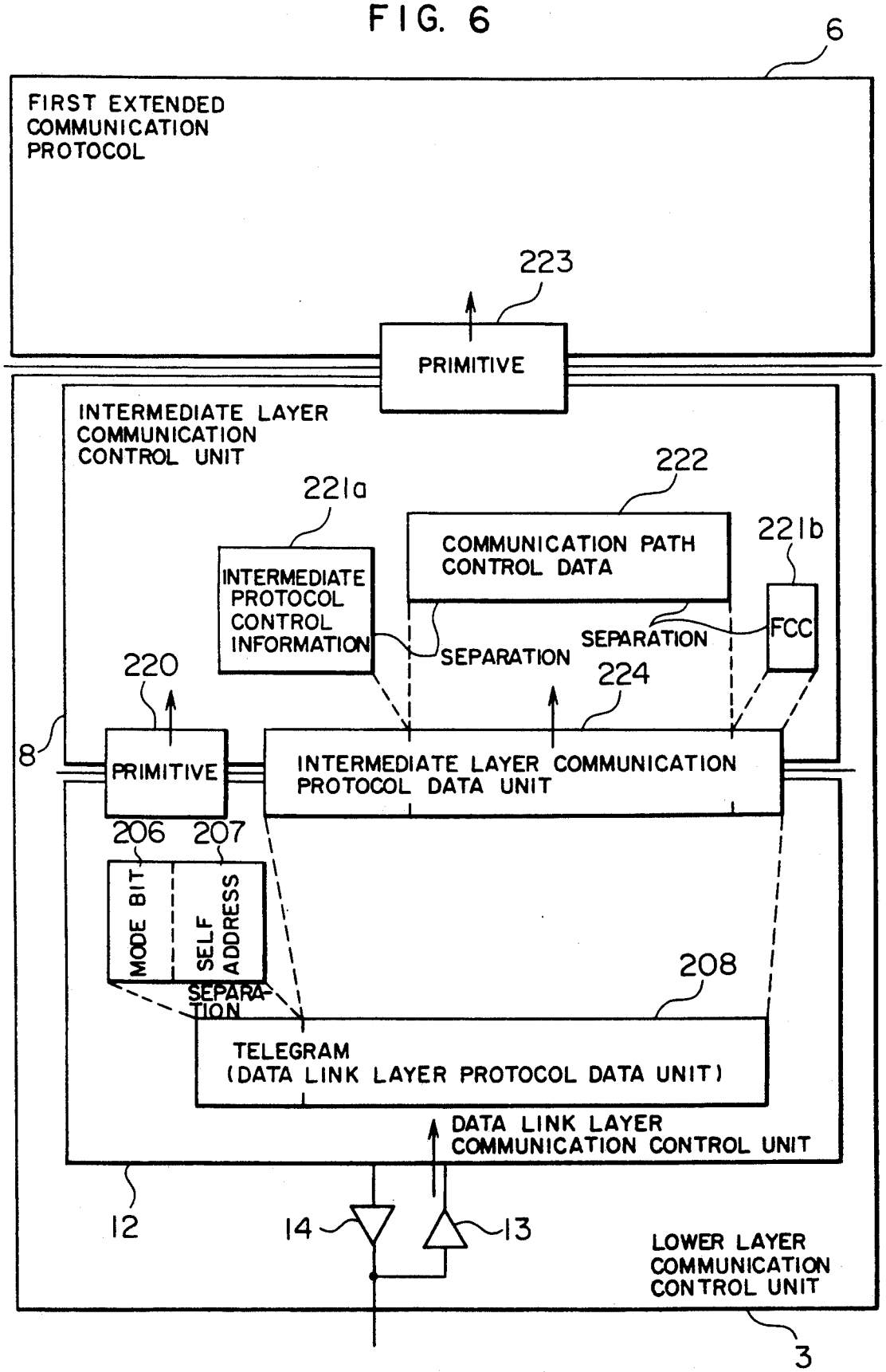

FIG. 6 is a view for explaining the processing performed when receiving a request of setting/cancelling a communication path, or receiving the response to the request of setting/cancelling from a communication partner after transmitting the request. Communication management unit 10 in FIG. 1, when receiving a reception indication primitive 220, searches communication path resister memory 4 on if the communication at issue is previously registered. If the path is not registered, communication management unit 10 examines if the preamble code is contained in communication path control data 220. The preamble code is collection of specific codes indicative of the type of a communication protocol, e.g. a character train of "INDUSTRY STANDARD PROTOCOL ver.1.0+ in terms of the ASCII code. Communication path management unit 10 decides the type of the extended communication protocol on the basis of character train which it pattern-matches. On the other hand, if it is decided that the communication at issue is a previously registered as a result of searching memory 4, it is decided to which extended communication protocol unit the primitive should be sent on the basis of the name of the extended communication protocol described in memory 4. Upper layer interface interface unit 9 decodes intermediate layer protocol control information 221a on the basis of intermediate layer protocol data unit 224 to decide what data follows. If communication path control data 222 follows, the primitive of showing the communication path setting/ cancelling or confirming it is set to the corresponding extended communication protocol unit.

Figure 7:
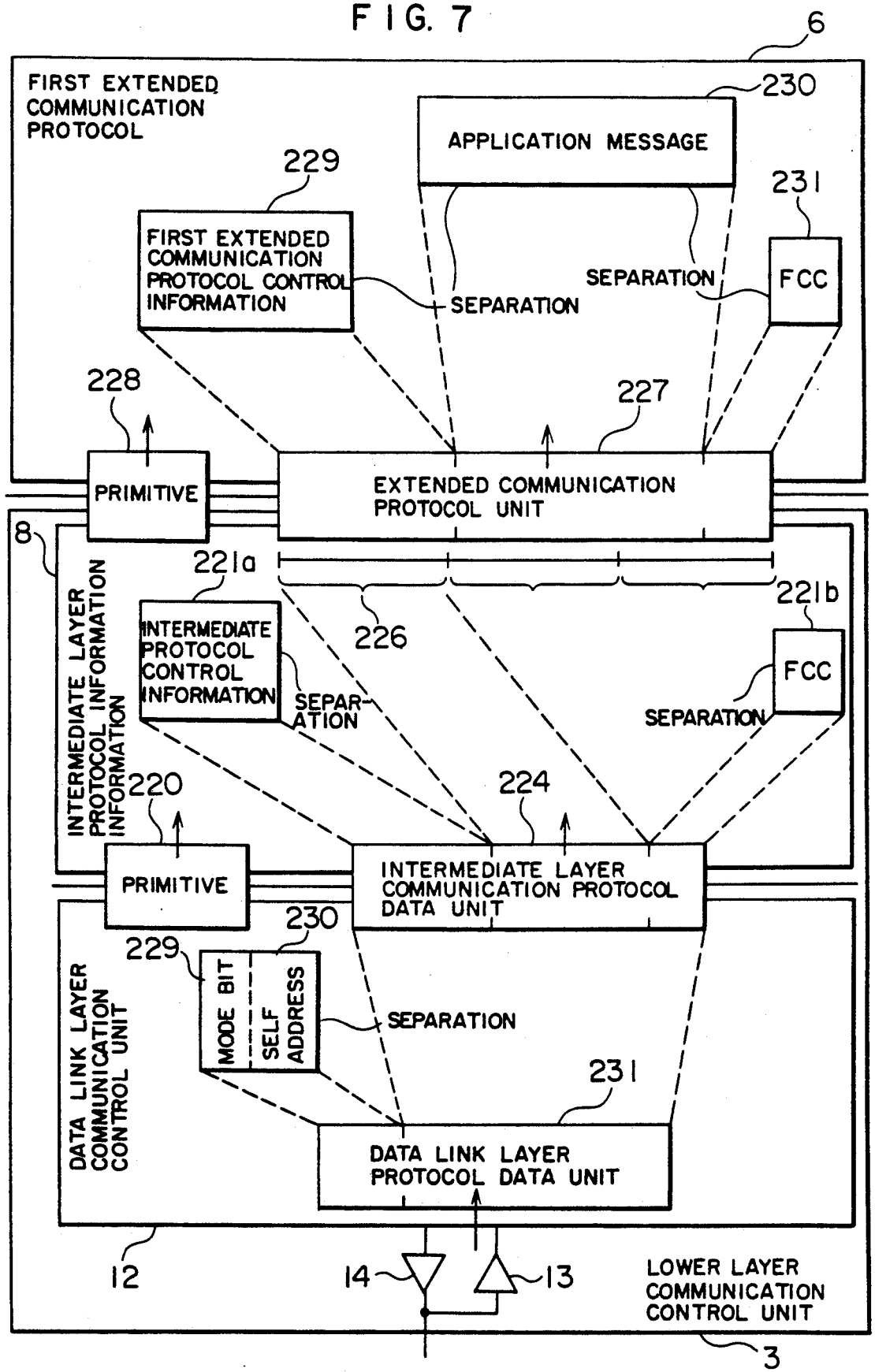

Further, if it is decided that divided elements 226 of the extended communication protocol data unit 227 as shown in FIG. 7 follow the control information 221 as a result of decoding the control information, they are buffered in upper layer interface unit 9 until they are assembled as extended communication protocol data unit 227; after completion of the assembling, the data unit 227 is sent to first extended communication protocol unit 6 together with a primitive 228 of reception indication in the example of FIG. 7. First extended communication protocol unit 6 detects the reception of the data unit 227 by the primitive 228, and decodes first extended communication control information 229 from extended communication protocol data unit 227 to decide what kind of message the application message following it is. Incidentally, a frame check code (FCC) 231 is a code for detecting and correcting a data error.

Figure 8:
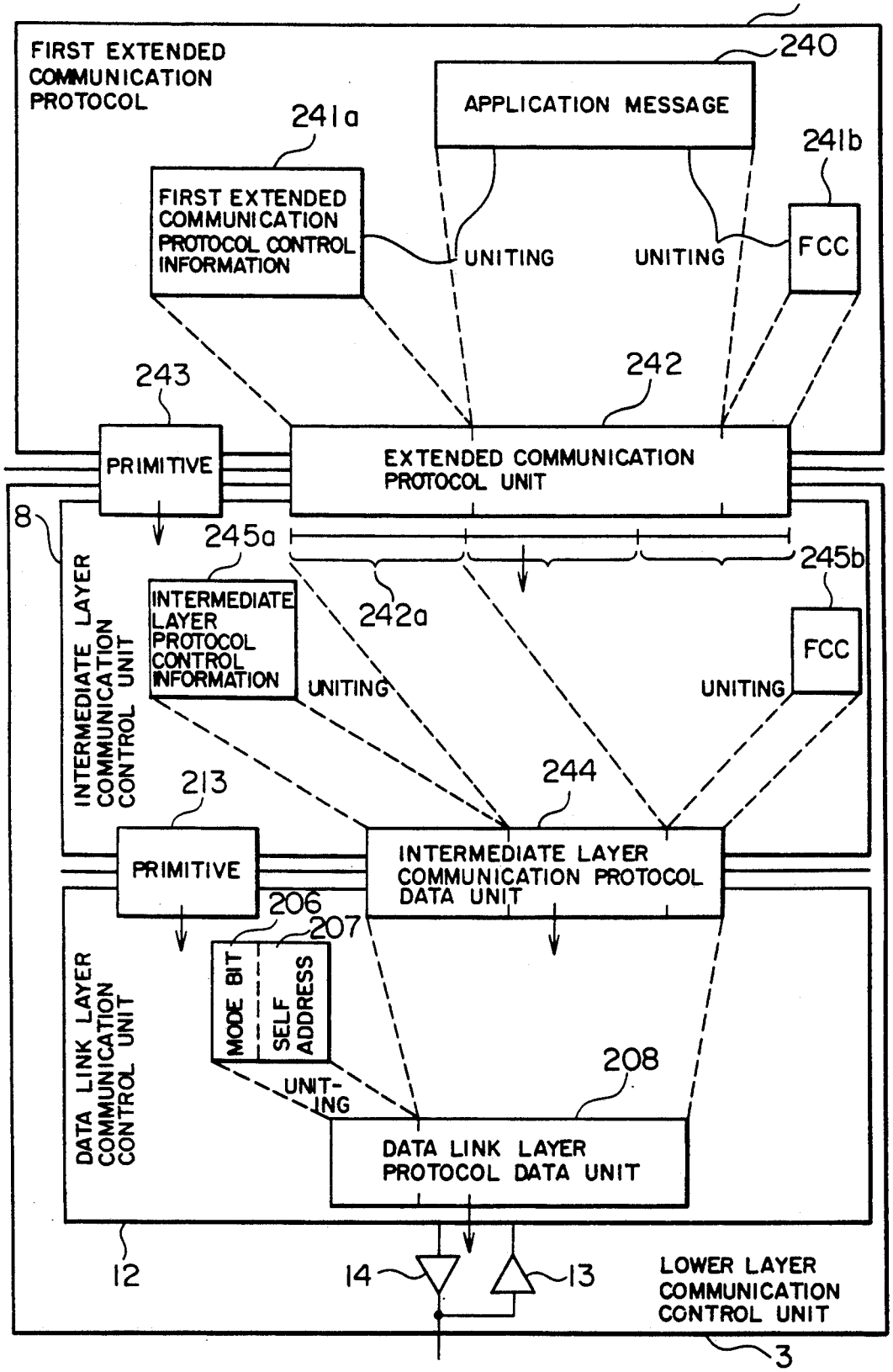
Figure 9:
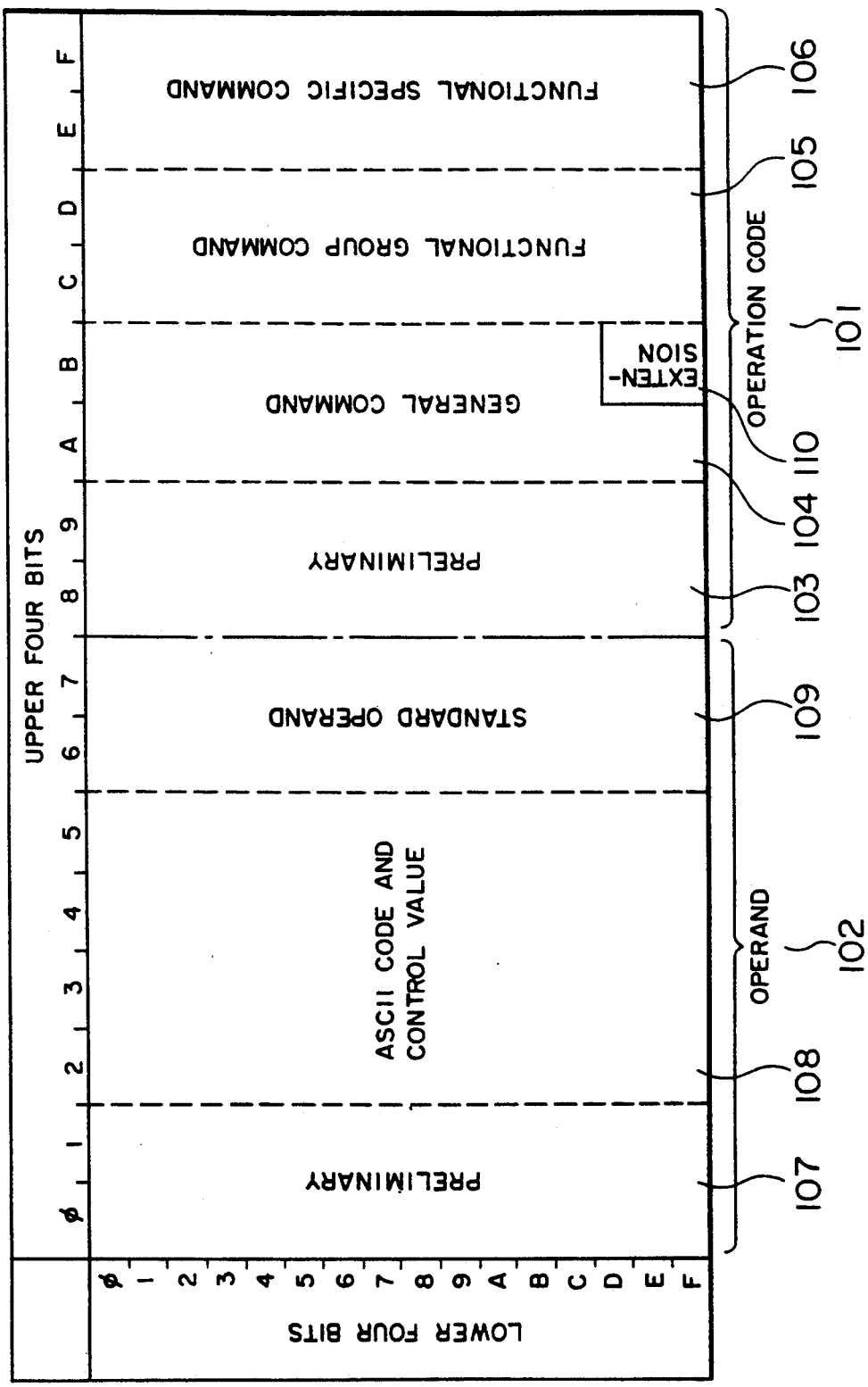
FIG. 9 is a command table in the application protocol handled by the prior art AVC communication device.
Figure 10:
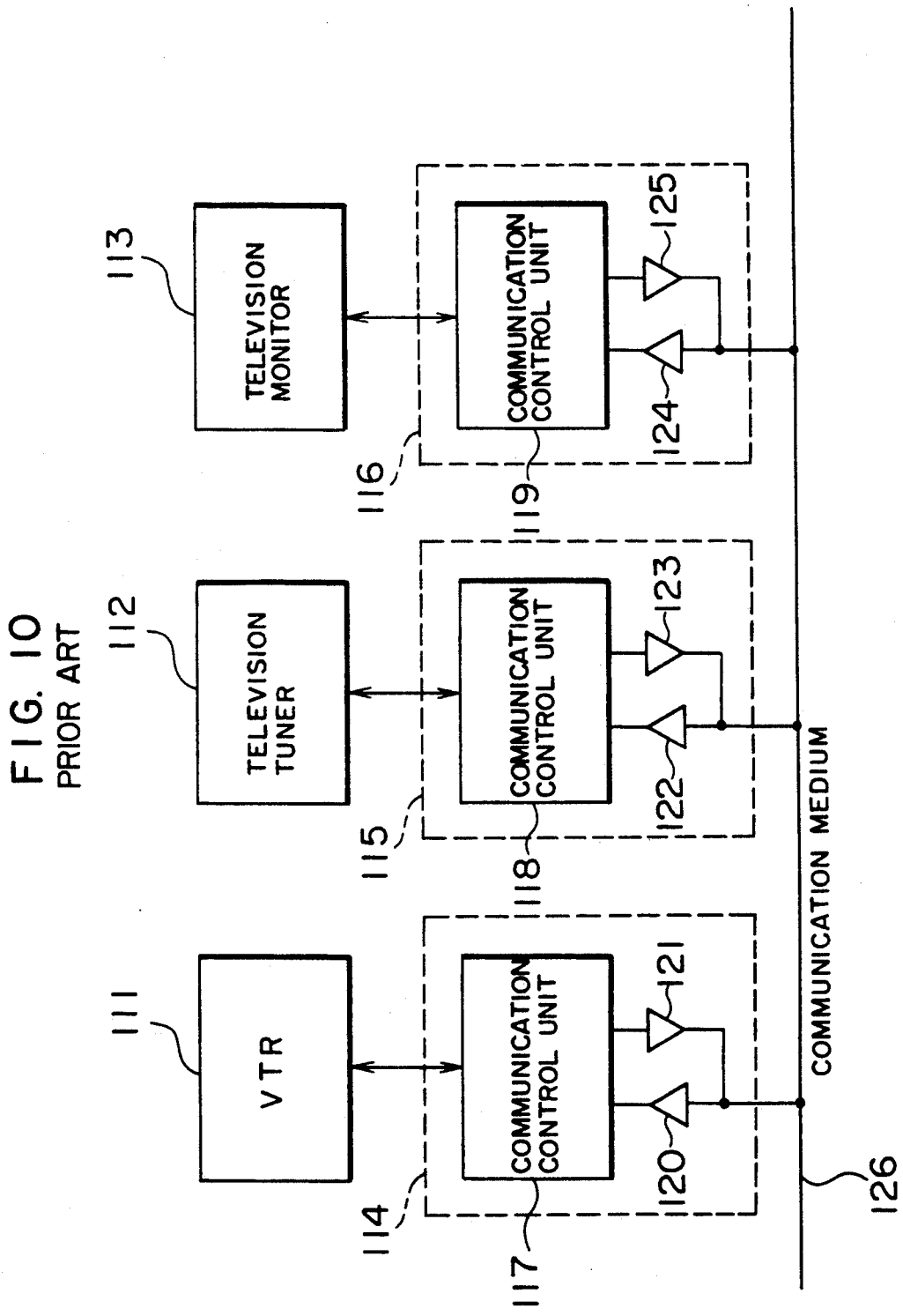
FIG. 10 is a block diagram of a network using the prior art AVC communication devices.

Referring to FIG. 8, explanation will be given for the case of requesting transmission from an extended communication protocol unit. Now it is assumed that an application message 240 occurs in first extended communication protocol unit 6. Then, it is supplied, in its front and rear, with first extended communication protocol control information 241a which represents the kind and property of the application message and a frame check code (FCC) 241b for error detection/correction, thereby providing an extended communication protocol data unit 242 which is sent to intermediate layer communication control unit (ILCCU) 8 together with a transmission request primitive 243. Upper layer interface unit 10 of ILCCU 8 detects the primitive 243 and examines the length of the extended communication control data unit 242; if it is decided that the data unit 242 cannot be transmitted to the communication path 15 at one time, the data unit 242 is divided into a necessary number of elements 242a. Further, each of the divided elements 242a is supplied, in its front and rear, with intermediate layer protocol control information 245a and FCC 245 to provide an intermediate layer communication protocol unit 244 which is in turn sent to data link layer communication control unit 12 together with a transmission request primitive 213 through data link layer interface unit 11. The transmission processing in data link layer communication unit 12 will not be explained here since it is the same as the processing described above.

Explanation will be given for examples of the protocol data unit in each of the intermediate communication unit and the extended communication protocol unit.

The intermediate layer communication protocol data unit (referred to as M-LAY-PDU) in the intermediate layer communication control unit can be written by
<M-LAY-PDU>::=<M-LAY protocol control information> <U-LAY protocol element> <M-FCC> |<M-FCC>|<preamble code> <M-LAY protocol control information> <M-FCC> where | represents 'or'. <M-LAY protocol information> can be written by <M-LAY protocol information>:-:=<communication path ID> <M-LAY protocol information>. <communication path ID> can be written by <communication path>::= <communication partner address> <communication path name>. <M-LAY protocol information> can be written by <M-LAY protocol information>::= <M-LAY protocol ID> <sequence No.> | <M-LAY protocol ID>. <U-LAY protocol element> is one of elements into which extended communication protocol data unit 227 or 228 is divided. <M-FFC> is a check code for error check. <preamble code> specific character code. <M-LAY protocol ID> serves to indicate an ACK or NACK response after reception, a status response or status request such as ready/busy/error, and request/showing/response/ confirmation for setting/canceling of a communication path. <sequence No.> is the number successively attached to each of elements so that if the extended communication protocol data unit is transmitted in a divided manner, the respective elements are connected in a correct order in a receiving side. If it is found that any divided element has fallen out, the error indicated by the above <M-LAY protocol ID> is reported to the transmission source.

The extended communication protocol data unit (referred to as U-LAY-PDU) in the extended communication protocol unit can be written by <U-LAY-PDU>::=<U-LAY protocol control information><application message> <U-FFC> |<U-LAY protocol control information U-FFC. Further, <U-LAY protocol control information> is written by <U-LAY protocol control information>::= <U-LAY protocol ID> <sequence No.>. <U-LAY protocol ID> is to show a status request for a communication partner, an ACK/NAK response after reception, a status response such as ready/busy/error, or setting/canceling of a communication path. <application message> is a real data necessary for a user. <U-FFC> is a frame check code for error detection/correction.

Although the severalced relate to the communication protocols between layers at the same level of different communication devices, explanation will be given for the primitive exchanged between an upper and lower layer of the same communication device.

The primitive (referred to as D-M-pri) between the data link layer communication control unit and the intermediate layer communication control unit is expressed as <D-M-pri>::= <communication partner address>
(1)

<transmission request ID>  <transmitted data>

|<communication partner address><reception request ID>
(2)

<received data> | <error/status information>.

The expression <transmission request ID> is to show a request of transmission of a telegram (descending direction). <reception request ID> is to show reception of a telegram from a communication partner (ascending direction). In FIGS. 4 to 8, for convenience of understanding, particularly the parts of (1) and (2) are represented as primitives (e.g. 204b in FIG. 4). <transmitted data> or <received data> is represented as the intermediate layer communication protocol data unit (e.g. 214 in FIG. 5). <error/status information> is error information indicating if the transmission has been successful, or status information of the data link layer communication control unit of a communication partner (both are primitives in the ascending direction).

The primitive (referred to as M-U-pri) between the intermediate communication control unit and the extended communication protocol unit will be expressed (the primitive between the intermediate layer communication control unit and the general communication protocol unit is entirely the same as D-M-pri since the intermediate layer communication unit performs no processing in this case). M-U-pri is expressed as <M-U-pri-ID> <communication path ID> <U-LAY-PDU>|<M-U-pri-ID> <communication path ID>  <U-error/status information> | <M-U-p[ri-ID> <communication ID>

Here, <communication path ID> is composed of <communication partner address> and <communication partner name> as mentioned above. <U-error/status information> is error information indicating if the transmission has been successful, or status information of the intermediate layer communication control unit of a communication partner (both are primitives in the ascending direction). <M-U-pri-ID> is to show request/indication/response/confirmation of setting/canceling of a communication path, or to show which of <U-LAY-PDU> and <U-error status information> the following primitive is.

Finally, additional explanation will be given for the communication path shown in FIG. 2. In FIG. 2, communication path memory 24a of communication device A21 stores information indicative of that communication path 'P' is established for communication device B31 and first extended communication protocol and of that communication path 'Q' is established for communication path C41 and second extended communication protocol. Communication path memory 34a of communication device B31 stores information indicative of that communication path 'P' is established for communication device A21 and first extended communication protocol and of that communication path 'R' is established for communication path C41 and second extended communication protocol. Similarly, communication path memory 44a of communication device C41 stores information indicative of that communication path 'Q' is established for communication device A21 and first extended communication protocol and of that communication path 'R' is established for communication path B31 and second extended communication protocol. Thus, the communication path register memory can memorize the communication path being used at present. Therefore, in the case of transmission, the extended communication protocol unit has only to designate the name of the communication path to be used since the address of a communication partner can be decided in the intermediate layer communication control unit. Also in the case of reception, the communication path register memory can be examined to decide the extended communication protocol on the basis of the address value of a transmission source and thus raise a reception indication primitive to the corresponding extended protocol unit. Thus, the communication control function of one lower layer can be used simultaneously by a plurality of application services. Additionally, in the embodiment of FIG. 2, it should be noted that the communication according to the general communication protocol is not stored in the communication register memory; the intermediate layer communication control unit decides that the telegram from the communication partner which is not stored in the memory is based on the general communication protocol. Further, although in the embodiment of FIG. 2, the first and second extended communication protocols are illustrated, they may be the same communication protocol. If it is desired that the communication processings in the upper layer are clearly separated for each application service, the protocols having the same structure can be designed in a manner of separating them into a first and a second extended communication protocol.

In accordance with the present invention, the following meritorious effects can be obtained.

(1) Since the communication device is designed as defined in claims 1, 2 and 3, it is possible to add the device having a new function to a conventional AVC system performing several services in accordance with a conventional communication protocol and to perform the service of a new function without obstructing the conventional service.

(2) Since the communication device is designed as defined in claim 4, any number of communication protocols of different kinds at an upper layer can be located in an AVC system without using a protocol switching command.

(3) Since the communication device is designed as defined in claim 5, the communication protocol at an upper layer is not limited by the length of a telegram which can be transmitted at one time on a communication transmission path.

We claim:

1. A communication device for layered protocols, comprising:
   an upper layer communication control unit having a plurality of upper layer communication protocols;
   a lower layer communication control unit, subordinated to said upper layer communication control unit, having a function of forming an inter-upper-layer communication by transmitting data sent from said upper layer communication control unit to a communication transmission path or sending data received from said communication path to said upper layer communication control unit; and
   a communication path register memory for storing a set of information pieces including an address of a communication partner device, a discriminator of the upper layer communication protocol being used and a name of a communication path,
   wherein a request of setting/canceling of the communication path, or a transmission request as well as designation of the communication path to be used, is performed from said upper layer communication control unit to said lower layer communication control unit, and indication of setting/canceling of the communication path, or indication of the communication path used as well as reception indication, is performed from said lower layer communication control unit to said upper layer communication control unit.

2. A communication device according to claim 1, wherein said upper layer communication control unit includes a general communication protocol and an extended communication protocol as upper layer communication protocols to be handled, and said communication path register memory stores a first said set of information pieces and a second said set of information pieces including the address of a communication partner device with which communication is being performed in accordance with the extended communication protocol and the name of the communication path being used.

3. A communication device according to claim 2, wherein said upper layer communication control unit is set so that it communicates with the communication partner device not registered in the communication path register memory in accordance with the upper layer general communication protocol.

4. A communication device for layered protocols, comprising:
   a communication path register memory for storing one of (a) a set of information pieces including an address of a communication partner device, a name of a communication path and a discriminator of an upper layer communication protocol and (b) a set of information pieces including an address of a communication partner device and a name of a communication path in order to store one or more communication paths;
   an upper layer communication control unit including a plurality of upper layer communication protocols; and
   a lower layer communication control unit subordinated to said upper layer communication control unit, having a function of forming an inter-upper-layer communication by transmitting data sent from said upper layer communication control unit to a communication transmission path or sending data received from said communication path to said upper layer communication control unit; and having functions of, if a request of setting a communication path for communication in accordance with the upper layer communication protocol is received from said upper layer communication control unit, sending a preamble code having a code indicative of the name of the upper layer communication protocol to be used and a discriminator of the communication path, and of, if the preamble code and the discriminator of the communication path are received, registering in said communication path register memory discriminators of at least one of the communication partner device, the communication path and the upper layer communication protocol;

wherein a request of setting/canceling of the communication path, or a transmission request as well as designation of the communication path to be used, is performed from said upper layer communication control unit to said lower layer communication control unit, and indication of setting/canceling of the communication path, or indication of the communication path used as well as reception indication, is performed from said lower layer communication control unit to said upper layer communication control unit.

5. A communication device for layered protocols, comprising an upper layer communication control unit for processing an upper layer communication protocol; and a lower layer communication control unit subordinated to said upper layer communication control unit, having a function of forming an inter-upper-layer communication by transmitting data sent from said upper layer communication control unit to a communication transmission path or sending data received from said communication path to said upper layer communication control unit in such a manner that if data to be transmitted according to the upper layer communication protocol is received from said upper layer communication control unit, it is transmitted by one frame in such a manner that it is divided at intervals of the data length permitted within one frame on a communication path, and if a frame including the divided data according to the upper layer communication protocol is received from the communication path, a plurality of frames are received until they are completed as data according to the upper layer communication protocol and data according to the upper layer protocol thus assembled is sent to said upper layer communication control unit;

wherein a request of setting/canceling of the communication path, or a transmission request as well as designation of the communication path to be used, is performed from said upper layer communication control unit to said lower layer communication control unit, and indication of setting/canceling of the communication path, or indication of the communication path used as well as reception indication, is performed from said lower layer communication control unit to said upper layer communication control unit.

* * * * *